A. G. WATERHOUSE & B. B. BREWER.
Engine Governor.
No. 233,175. Patented Oct. 12, 1880.
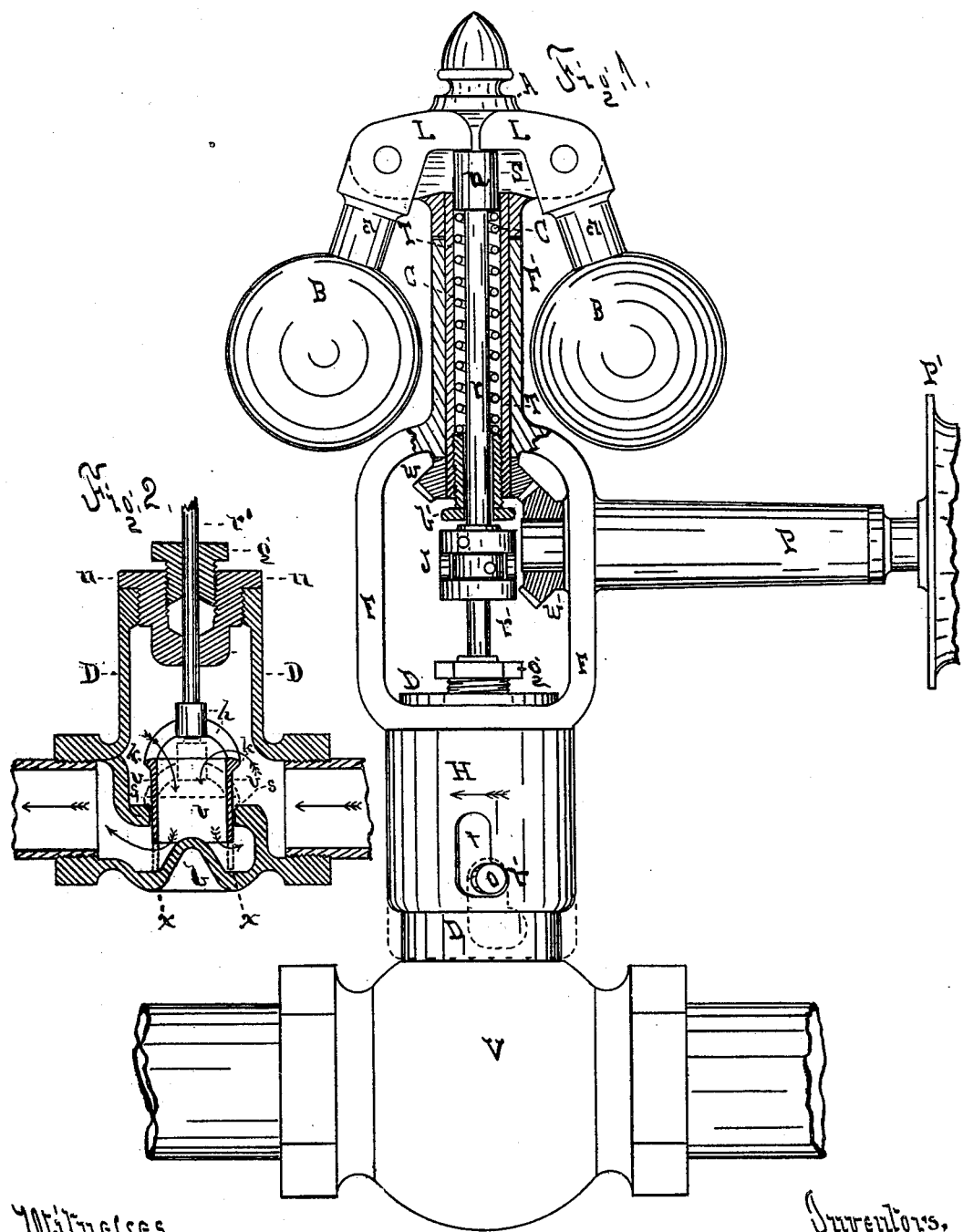

UNITED STATES PATENT OFFICE.

ADDISON G. WATERHOUSE AND BENJAMIN B. BREWER, OF SACRAMENTO, CALIFORNIA.

ENGINE-GOVERNOR.

SPECIFICATION forming part of Letters Patent No. 233,175, dated October 12, 1880.

Application filed September 25, 1879.

*To all whom it may concern:*

Be it known that we, ADDISON G. WATERHOUSE and BENJAMIN B. BREWER, of the city of Sacramento, State of California, have invented a new and useful Improvement in Engine-Governors, of which the following is a specification.

The invention relates to that class of governors in which a spring is used in combination with centrifugal balls, and also relates to that class of governors provided with a safety-stop, used to shut the steam off and stop the engine in case the belt should break or run off from the governor-pulley.

The invention consists in connecting the governor to the governor-valve by having the lower part of the governor bored out cylindrically, so as to fit loosely over part of the valve, and providing the valve with a check-pin, so that while the governor-belt is on it will keep the governor pressed against the check-pin and support the governor in position for allowing the engine to run, and in case the governor-belt should run off or get too slack to revolve the governor, the governor will slip down and past the check-pin and over the valve and stop the engine by closing the steam-passage.

The invention also consists in the construction of the valve.

In the accompanying drawings, Figure 1 is a sectional elevation of our governor. Fig. 2 is a sectional view of the governor-valve.

In Fig. 1 is shown a sectional elevation of the governor attached to a governor-valve shell, V. Said shell can be constructed in any of the forms in use, and is to be provided with a dome or cylinder, D, provided at the top with a stuffing-box, $g$. The cylinder D is to be turned off cylindrically, and is provided with a stop-pin, $o$.

The governor is composed of the sleeve H, frame F, pulley-arm P, and the governor-neck F', all being composed of one piece; also, the head S, balls B, arms $a$, fingers L, valve-rod $r$, with head $n$, hollow spindle T, passing through the neck F', connected to and turning with the head S, and wheel $w$; also, the driving-wheel $w'$, connected to and driven by the pulley P' through a spindle that has its bearing in the arm P, so that the rotation of pulley P' will cause the head S and balls B to revolve in the usual manner.

In the stem F, which is made of piping of a tubular form, is inserted a spiral spring, C, which is of sufficient pressure to perform the work required. Said spring is supported in the stem by the bushing $b'$, which is provided with a head or means for turning said bushing, in order to screw the same in or out, and tightening or loosening the spring C, thus regulating the speed of the engine by the pressure of the spring C affecting the motion of the balls B. The rod $r$ passes freely through said bushing. The upper end of rod $r$ is provided with a head, $n$, which about fills the bore of T, said head resting on the top of the spring C, which forces it upward, so that any pressure on the head $n$ compresses the spring C. Now, the balls B and arms $a$ are pivoted to the head S, as shown, and are free to swing on their pivots. The arms $a$ are provided with projections L, so arranged that as the balls and arms swing out and upward by the centrifugal force of their rotation the projections L will descend and press on the head $n$, thus forcing the rod $r$ downward and compressing the spring C, and as the rotation decreases the pressure of C forcing the projections L upward and the balls B down in the position shown.

As will be seen, in this governor the spring C, rod $r$, and head $n$ all revolve with the stem F, thus avoiding the wear that would occur if the stem F rotated around them. In this governor the head can be made to revolve rapidly, thus making it practical to use comparatively light balls and gain the required power by their centrifugal force, and they are forced down by the strength of the spring C instead of their weight.

The result and advantage is, that they are more prompt and sensitive in their action, and the governor can be made smaller and for less cost than a larger kind. Another advantage is, that the spring C keeps the rod $r$ constantly pressed against the fingers L, and thus preventing any loose or lost motion from occurring. As the rod $r$ rotates, we provide for it a swivel-joint, J, any form of which may be used, the object being to impart the longitudinal motion to the lower part of the rod $r'$ without turning where it passes through the stuffing-box $g$.

The second part of our invention consists in the manner of attaching the governor to the governor-valve shell, so that in case the governor-belt should break or come off the weight of the governor will stop the engine. The method of obtaining this is by making a part of the governor-valve shell V cylindrical, as shown, and at the top of cylinder D have a stuffing-box, $g$, for the rod $r'$. The lower part of the governor or sleeve H is free to slide up and down and turn on D. H is provided with a slot, $t$, as shown, and D with a pin, O, rigidly connected to D. When H is placed on D the pin O is tightly inserted and holds the two together, but allows H to move in the side notch, as shown, or slide down, as shown in dotted lines.

The drawings show the governor in position for working. The belt placed on the pulley P (from a direction out from the drawings) has a tendency, by its tension, to swing the governor around in the direction shown by arrow on H, thus causing the slot in H at $t$ to hug around the pin O and keep the governor-frame sustained, as shown; but if the belt should break or run off from P the strain would be relieved, and the sleeve would turn back and slide down, as shown in dotted lines, thus causing the weight of the governor-frame, as it descends, to force the rod $r'$ down and shut off the steam.

In Fig. 2 is shown a sectional view of the valve. The form in this case is similar to a globe-valve, the shell of which is tapped to receive the steam-pipes, through which steam passes in the direction shown by the arrows. The shell is also made so as to form the dome D, and the valve-seat S formed similar to the seat in the globe-valve. The top of the dome D is closed by a plug, $n$. In the plug is arranged the stuffing-box and gland $g$, through which the valve-rod $r'$ passes.

The valve $v$ is a cylindrical tube, and is provided with hub $h$, into which the rod $r'$ is secured. The hub $h$ is connected to $v$ by the open arms through which the steam passes.

The valve $r$ is provided at its upper outside periphery with a bead, $k$, that fits closely on the valve-seat S when the valve $v$ is at its lowest position. At the same time the lower periphery rests upon the lower part of the valve-chamber at $x$, which is finished into a valve-seat, so that when the valve is down, as shown in dotted lines, the valve $v$ forms a steam-tight joint at $x$, and the bead $k$ forms a steam-tight joint at S, thus completely preventing the steam from passing through the valve.

The valve $r$ is made in the form of a tube, as shown, being open at the top and bottom, and as the steam presses evenly outward on all sides of the valve $v$ it is completely balanced, so that the pressure of steam cannot offer any resistance to its working up and down. In this case the lower part of the valve-shell at $v$ is indented, so as to form a cone that extends up into the valve $r$, its purpose being to partly fill the opening under the valve $v$ and reduce the amount of steam that would pass through when the valve is open a little way.

In forming the safety-stop by providing the governor with sleeve H, that fits over the valve-dome D, we do not confine ourselves to the use of the pin O and slot $t$, for any lug or slip-step that will answer the same purpose will do in their place.

What we claim as new is—

1. The frame carrying the valve-working mechanism of a governor-valve adapted to move in a vertical direction by means of a pin and a recessed slot in the frame, and thereby close the valve when the driving-belt becomes inoperative, substantially as and for the purposes set forth.

2. In a steam-governor, the valve-shell V, provided with the cylindrical chamber or dome D, having the stop O, in combination with the sleeve H, having recessed slot $t\ r$, the frame F, pulley P, and belt, whereby the belt tends to hold up the frame by pressing the recess of the slot against the stop, substantially as and for the purposes set forth.

ADDISON G. WATERHOUSE.
BENJAMIN B. BREWER.

Witnesses:
BARTON B. WARD,
ELISON V. BUCKLEY.